United States Patent
Zhao et al.

(10) Patent No.: US 12,452,874 B2
(45) Date of Patent: Oct. 21, 2025

(54) METHOD FOR MONITORING PHYSICAL DOWNLINK CONTROL CHANNEL, USER TERMINAL AND READABLE STORAGE MEDIUM

(71) Applicant: SPREADTRUM COMMUNICATIONS (SHANGHAI) CO., LTD., Shanghai (CN)

(72) Inventors: Sicong Zhao, Shanghai (CN); Xinghang Gao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 398 days.

(21) Appl. No.: 17/914,975

(22) PCT Filed: Mar. 24, 2021

(86) PCT No.: PCT/CN2021/082527
§ 371 (c)(1),
(2) Date: Sep. 27, 2022

(87) PCT Pub. No.: WO2021/190522
PCT Pub. Date: Sep. 30, 2021

(65) Prior Publication Data
US 2023/0146873 A1    May 11, 2023

(30) Foreign Application Priority Data
Mar. 27, 2020   (CN) .......................... 202010232194.3

(51) Int. Cl.
*H04W 72/23* (2023.01)
*H04L 27/26* (2006.01)
(Continued)

(52) U.S. Cl.
CPC ....... *H04W 72/23* (2023.01); *H04L 27/26025* (2021.01); *H04W 24/08* (2013.01); *H04W 72/12* (2013.01)

(58) Field of Classification Search
CPC ..... H04W 72/23; H04W 24/08; H04W 72/12; H04L 27/26025
See application file for complete search history.

(56) References Cited

U.S. PATENT DOCUMENTS 11,483,767 B2 * 10/2022 Wu ....................... H04L 5/0092
2018/0124815 A1   5/2018 Papasakellariou
(Continued)

FOREIGN PATENT DOCUMENTS

CN      102845121 A    12/2012
CN      109429258 A    3/2019
(Continued)

OTHER PUBLICATIONS

EPO Extended European Search Report for corresponding EP Application No. 21774050.5; Issued, Aug. 2, 2023.
(Continued)

*Primary Examiner* — Sai Aung
(74) *Attorney, Agent, or Firm* — CANTOR COLBURN LLP

(57) ABSTRACT

A physical downlink control channel monitoring method, a user terminal and a readable storage medium. The method comprises: receiving downlink control information in an nth slot; and when the downlink control information comprises switching indication information of a physical downlink control channel monitoring state, starting from an (n+X)th slot, executing a physical downlink control channel monitoring behavior according to a switched physical downlink control channel monitoring state, wherein n and X are both integers and X≥1. By using the solution, the switching of a
(Continued)

monitoring behavior of a physical downlink control channel during scheduling of the same bandwidth part can be realized.

19 Claims, 4 Drawing Sheets

(51) Int. Cl.
  *H04W 24/08* (2009.01)
  *H04W 24/10* (2009.01)
  *H04W 72/0446* (2023.01)
  *H04W 72/12* (2023.01)

(56) References Cited

U.S. PATENT DOCUMENTS

| | | | |
|---|---|---|---|
| 2019/0097874 A1* | 3/2019 | Zhou | H04W 16/28 |
| 2020/0029315 A1 | 1/2020 | Lin et al. | |
| 2021/0368367 A1 | 11/2021 | Jiang et al. | |

FOREIGN PATENT DOCUMENTS

| | | |
|---|---|---|
| CN | 109923824 A | 6/2019 |
| CN | 109963326 A | 7/2019 |
| EP | 2560451 A1 | 2/2013 |
| WO | 2019099880 A1 | 5/2019 |
| WO | 2019192396 A1 | 10/2019 |
| WO | 2020056752 A1 | 3/2020 |
| WO | WO-2020252705 A1 * | 12/2020 |
| WO | 2021098053 A1 | 5/2021 |

OTHER PUBLICATIONS

"14 UE procedures realted to Sidelink", 3GPP TS 36.213 V14.12.0 (Sep. 2019) Release 14, pp. 397-455.
Apple Inc., "Cross Slot Scheduling Design for UE Power Saving"; 3GPP TSG RAN WG1 #99 R1-1912828; Nov. 18-22, 2019; 13 pages.
Apple Inc., "Remaining Issues on Cross Slot Scheduling Technique for UE Power Saving"; 3GPP TSG RAN WG1 #100-e R1-2000863; Feb. 24-Mar. 6, 2020; 4 pages.
Ericsson, "Summary on [AT109e][033][IIOT] Scheduling Enhancements"; 3GPP TSG-RAN WG2 #109-e R2-2002294; Feb. 24-Mar. 6, 2020; 19 pages.
Intel Corporation, "Open aspects on SL Configured Grant Design"; 3GPP TSG-RAN WG2 Meeting #109 electronic R2-2000455; Feb. 24-Mar. 6, 2020; 5 pages.
International Search Report for International Application No. PCT/CN2021/082527; Date of mailing, Jun. 23, 2021.
Qualcomm Incorporated, "BWP operation in C-DRX mode"; 3GPP TSG-RAN Meeting #101 R22803565; Feb. 26, Mar. 2, 2018; 6 pages.
Vivo, "Remaining aspects of cross-slot scheduling power saving techniques"; 3GPP TSG RAN WG1 #99 R1-1912050; Nov. 18-22, 2019; 7 pages.
ZTE, "Procedure of cross-slot scheduling power saving techniques"; 3GPP TSG RAN WG1 #99 R1-1911926; Nov. 18-22, 2019; 15 pages.

* cited by examiner

METHOD FOR MONITORING PHYSICAL DOWNLINK CONTROL CHANNEL, USER TERMINAL AND READABLE STORAGE MEDIUM

CROSS REFERENCE TO RELATED APPLICATIONS

The present application the national stage of International Application No. PCT/CN2021/082527, filed on Mar. 24, 2021, which claims the priority to Chinese Patent application Ser. No. 202010232194.3, titled "PHYSICAL DOWNLINK CONTROL CHANNEL MONITORING METHOD, USER TERMINAL AND READABLE STORAGE MEDIUM", filed on Mar. 27, 2020 with the China National Intellectual Property Administration, both of which are incorporated herein by reference in their entireties.

FIELD

The present disclosure relates to the field of communication technology, and in particular to a method for monitoring a physical downlink control channel, a user equipment and a readable storage medium.

BACKGROUND

The battery life of user equipment (UE) is an important aspect of user experience, which will affect the use experience of 5G user terminal or service.

To this end, some technical features are introduced in the 5G system for indicating changes in user terminal behavior, such that the user terminal may be in a power saving state under appropriate conditions to save terminal power. This state switching involves a variety of configuration changes, which includes bandwidth part (BWP) switching (switching to BWP with a narrower bandwidth), parameter switching of a physical downlink control channel (PDCCH) search space (such as switching a monitoring periodicity to a larger periodicity), PDCCH monitoring skipping and using cross-slot scheduling with a minimum scheduling interval greater than 0, and the like.

In the standard technology research of 5G new air interface (NR) in Release 16 version, the energy-saving technology part based on cross-slot scheduling is completed. In the upcoming research for Release 17 version, the technology of reducing PDCCH monitoring will be considered as one of the key technologies discussed.

In the currently proposed method, the change of PDCCH monitoring behavior, such as changing PDCCH monitoring parameters (including periodicity, duration and offset), PDCCH skipping duration, and the like, is indicated based on downlink control information (DCI). However, there is no solution for when the user terminal starts to execute the indication information after receiving the DCI indicating the change of the PDCCH monitoring behavior.

SUMMARY

The problem to be solved by the present disclosure is to determine a time when the user terminal starts to switch the PDCCH monitoring behavior after receiving the DCI of the change of the PDCCH monitoring behavior.

In order to solve the above problem, a method for monitoring a physical downlink control channel is provided according to an embodiment of the present disclosure. The method includes:

receiving downlink control information in an n-th time slot; and performing, from a (n+X)-th time slot, physical downlink control channel monitoring based on a switched physical downlink control channel monitoring state, in a case that the downlink control information comprises switching indication information on the physical downlink control channel monitoring state, wherein n and X are integers, and X is greater than or equal to 1.

In an embodiment, a value of X is determined based on a value of a minimum available scheduling delay activated and applied in a currently active downlink bandwidth part.

In an embodiment, the value of X is determined based on the value of the minimum available scheduling delay activated in the currently active downlink bandwidth part by:

in a case that the minimum available scheduling delay is greater than 0, setting the value of X to be the minimum available scheduling delay, or setting the value of X to be a greater of the minimum available scheduling delay and Z, where a value of Z corresponds to a subcarrier spacing of the currently active downlink bandwidth part where the downlink control information is located; and in a case that the minimum available scheduling delay is equal to 0, setting the value of X to be 1 or Z.

In an embodiment, in a case that the subcarrier spacing of the currently active downlink bandwidth part where the downlink control information is located is 15 Khz or 30 Khz, the value of Z is 1; and in a case that the subcarrier spacing of the currently active downlink bandwidth part where the downlink control information is located is 60 Khz or 120 Khz, the value of Z is 2.

In an embodiment, the value of X is a fixed value.

In an embodiment, in a case that X is equal to 1, a skipping duration of the physical downlink control channel monitoring indicated by the downlink control information is greater than the minimum available scheduling delay.

In an embodiment, the switching indication information on the physical downlink control channel monitoring state includes at least one of:

skipping all or part of the physical downlink control channel monitoring in a time period; and switching a parameter of a physical downlink control channel search space.

In an embodiment, the skipping all or part of the physical downlink control channel monitoring in a time period includes:

in a current discontinuous reception periodicity, not monitoring the physical downlink control channel.

A user equipment is further provided according to an embodiment of the present disclosure. The user equipment includes: a receiving unit and a monitoring unit.

The receiving unit is configured to receive downlink control information in an n-th time slot.

The monitoring unit is configured to perform physical downlink control channel monitoring from a (n+X)-th time slot, based on a switched physical downlink control channel monitoring state, in a case that the downlink control information comprises switching indication information on a physical downlink control channel monitoring state, wherein n and X are both integers, and X is greater than or equal to 1.

In an embodiment, a value of X is determined based on a value of a minimum available scheduling delay activated and applied in a currently active downlink bandwidth part.

In an embodiment, in a case that the minimum available scheduling delay is greater than 0, the value of X is set to be the minimum available scheduling delay, or a greater of the minimum available scheduling delay and Z, where a value of Z corresponds to a subcarrier spacing of the currently active downlink bandwidth part where the downlink control information is located; and in a case that the minimum available scheduling delay is equal to 0, the value of X is set to be 1 or Z.

In an embodiment, in a case that the subcarrier spacing of the currently active downlink bandwidth part where the downlink control information is located is 15 Khz or 30 Khz, the value of Z is 1; and in a case that the subcarrier spacing of the currently active downlink bandwidth part where the downlink control information is located is 60 Khz or 120 Khz, the value of Z is 2.

In an embodiment, the value of X is a fixed value.

In an embodiment, in a case that X is equal to 1, a skipping duration of the physical downlink control channel monitoring indicated in the downlink control information is greater than the minimum available scheduling delay.

A computer readable storage medium is further provided according to an embodiment of the present disclosure. The computer readable storage medium has a computer program stored thereon. The computer program, when being executed by a processor, implements steps of any one of the above methods.

A user equipment is further provided according to an embodiment of the present disclosure. The user equipment includes a memory and a processor, where the memory stores a computer program capable of being executed on the processor. The computer program is executed by the processor to implement steps of any one of the above methods.

Compared with the conventional technology, the technical solutions according to the embodiment of the present disclosure have the following advantages.

With the above solution, when the downlink control information includes switching indication information on the physical downlink control channel monitoring state, the physical downlink control channel is monitored from a (n+X)-th time slot, based on the switched physical downlink control channel monitoring state. In this way, the physical downlink control channel can be monitored in the same bandwidth part scheduling process.

DETAILED DESCRIPTION OF EMBODIMENTS

Figure 1:
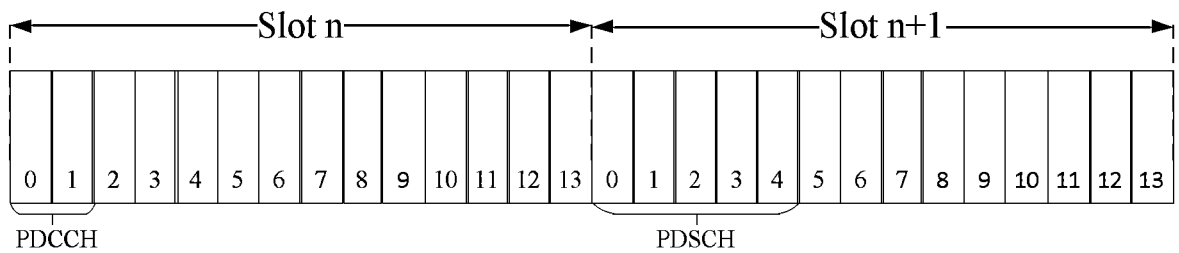
FIG. 1 shows a schematic diagram of cross-slot scheduling.

The research on a first version of 5G mobile communication standard is completed in 2018. Based on the first version of the 5G standard, device manufacturers and operators may begin production of devices and deployment of 5G networks.

In order to meet the performance requirements, many new technologies are introduced into the 5G system, such as a large transmission bandwidth, a large subcarrier spacing, a small processing unit, more antennas, and the like. However, due to the introduction of these technologies, the energy consumption of 5G user terminal increases several times compared with that of 4G user terminal.

Since the volume and battery capacity per unit volume of the current user terminal have not been greatly improved, the battery life of 5G user terminal cannot meet the daily usage requirements, which greatly affects the user experience. To this end, the 3GPP standardization organization has established a 5G power saving item, hoping to discover technologies to save power consumption of the terminals to improve the problem of high power consumption of 5G terminals. The power saving of the user terminal can be carried out in many ways, which may include standardized contents and contents to be standardized.

The standardized contents may include: a wake-up signal, and a restriction of cross-slot scheduling. The contents to be standardized include: switching of PDCCH monitoring state and the like.

In order to facilitate the understanding of the following embodiments of the present disclosure, the cross-slot scheduling is briefly described below.

Cross-slot scheduling refers to that a time slot in which scheduling information (that is DCI) is received, is not in the same time slot as the physical downlink shared channel (PDSCH) scheduled by the DCI. In long term evolution (LTE), the DCI and the scheduled PDSCH are in the same time slot. In order to improve the scheduling flexibility in 5G NR, the scheduled PDSCH may be located in the several time slots after the time slot where the DCI is located.

The cross-slot scheduling under Release-15 is realized by configuring a time domain resource allocation (TDRA) table. The TDRA table is an indicator table with a maximum of 16 rows. As shown in Table 1, the first column represents a serial number, that is, the index. The second column represents the value of K0, where K0 is a scheduling delay used in scheduling of the PDSCH, that is, a time slot interval between the time slot for receiving the DCI and the scheduled PDSCH. For example, when K0 is equal to 1, the PDCCH is in the n-th time slot, and then the corresponding PDSCH is in the (n+1)-th time slot.

The third column of the TDRA table represents a mapping type. A represents mapping based on a slot (which refers to that one slot is one scheduling unit, and the PDCCH is always located in the first 1, 2 or 3 symbols of a slot). B represents mapping based on a mini-slot (which refers to that several symbols forms one scheduling unit, and the starting position of PDCCH is not limited to the first symbol in the slot based on the number of symbols in the mini-slot, for example, if the mini-slot length is 7 symbols, the PDCCH may be located at the first symbol or at the 8-th symbol).

The fourth column of the TDRA table represents a start symbol and a length indication (Start and Length Indication Value, SLIV). The value shown in this column indicates the start symbol position of the PDSCH and the duration symbol length of the PDSCH.

TABLE 1

| Index | K0 | Type | SLIV |
|---|---|---|---|
| 0 | 0 | A/B | XXX |
| 1 | 1 | A | 56 |
| 2 | 4 | A/B | XXX |
| 3 | 6 | A/B | XXX |
| ... | ... | ... | ... |
| 15 | 32 | A/B | XXX |

For example, when the index is equal to 1, K0 is equal to 1, type is equal to A, and SLIV is equal to 56, the schematic diagram of cross-slot scheduling may refer to FIG. 1.

From the perspective of power saving, cross-slot scheduling may allow the UE to avoid unnecessary PDSCH buffering, and may use a narrower PDCCH receiving bandwidth to save equipment power consumption. However, the K0 in the TDRA table configured for the current cross-slot scheduling may be equal to 0 and greater than 0. If K0 is configured to be equal to 0, the UE does not determine whether the K0 of the current time slot is greater than 0 or equal to 0. In this case, the PDSCH needs to be buffered all the time.

In the new version Release-16, the minimum available scheduling delay (K0min) may be indicated to be greater than 0. When K0 is always greater than 0, the UE may be kept in the state of cross-slot scheduling to save power. For the indication and switching of K0min, an application delay of a new K0min is introduced, in consideration of the receiving time and processing time of PDCCH and the adjusting time of related modules. For example, when the current minimum available scheduling delay K0min is equal to 4, that is, the starting position of the PDSCH scheduled by DCI is located at a slot position of the time slot where the DCI is located plus 4. In this way, the UE may perform the DCI processing in 4 time slots, that is, decoding the PDCCH before the slot where the PDSCH is located at the earliest, rather than several slots. If the DCI is received in a time slot 0, the DCI may be decoded before the time slot 4. Whether the processing may be relaxed to the time slot position corresponding to K0min depends on the UE implementation. In the case of no other processing timelines to be satisfied, there are some opportunities to do such level of relaxation. Relaxing the DCI processing may reduce the clock frequency and voltage of the processing module, which is extremely helpful for reducing UE power consumption.

In the currently proposed methods for monitoring a PDCCH channel, changes in PDCCH monitoring, such as changing PDCCH search space parameters (including periodicity, duration and offset), PDCCH skipping duration and the like, are indicated based on downlink control information (DCI). However, there is no solution for when the user terminal starts to execute the indication information after receiving the DCI indicating the change of the PDCCH monitoring behavior.

In view of the above problems, a method for monitoring a physical downlink control channel is provided according to an embodiment of the present disclosure. In the method, when the downlink control information includes switching indication information on the physical downlink control channel monitoring state, the physical downlink control channel is monitored from a (n+X)-th time slot, based on the switched physical downlink control channel monitoring state. In this way, the physical downlink control channel can be monitored in the same bandwidth part scheduling process.

In order to make the above objectives, features and advantages of the present disclosure more apparent and easy to be understood, embodiments of the present disclosure will be described in detail hereinafter in conjunction with the drawings.

Figure 2:
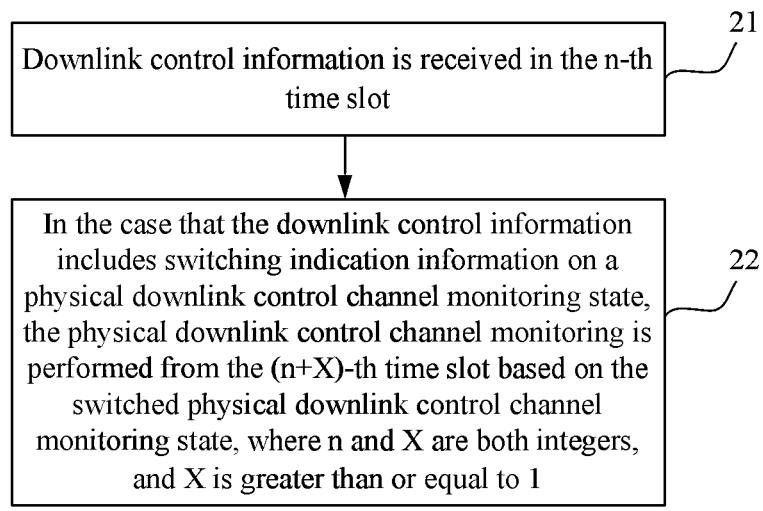
FIG. 2 shows a flowchart of a method for monitoring a physical downlink control channel according to an embodiment of the present disclosure.

Referring to FIG. 2, a method for monitoring a physical downlink control channel is provided according to an embodiment of the present disclosure. The method may include step 21 and step 22.

In step 21, downlink control information is received in the n-th time slot.

In an embodiment of the present disclosure, the physical downlink shared channel (PDSCH) scheduled by the DCI is the same BWP scheduling. That is, the BWP where the PDSCH scheduled by the DCI is located is the same as the current active BWP where the DCI is located. The BWP where the PDSCH scheduled by the DCI is located may be obtained by the UE from the DCI, that is, is indicated by the base station through the DCI.

In step 22, in the case that the downlink control information includes switching indication information on a physical downlink control channel monitoring state, physical downlink control channel monitoring is performed from the (n+X)-th time slot based on the switched physical downlink control channel monitoring state; where n and X are both integers, and X is greater than or equal to 1.

In a specific implementation, the DCI may include switching indication information on the PDCCH monitoring state, which is used to instruct UE to switch the PDCCH monitoring state. The DCI may not include the switching indication information on the PDCCH monitoring state. Accordingly, the UE does not need to switch the PDCCH monitoring state.

In an embodiment of the present disclosure, the switching indication information on the PDCCH monitoring state may only include: skipping of all or part of the PDCCH monitoring in a time period (PDCCH skipping). The switching indication information on the PDCCH monitoring state may only include: parameter switching of a PDCCH search space (SS). The switching indication information on the PDCCH monitoring state may include both skipping of all or part of the PDCCH monitoring in the time period and parameter switching the PDCCH search space.

Figure 3:
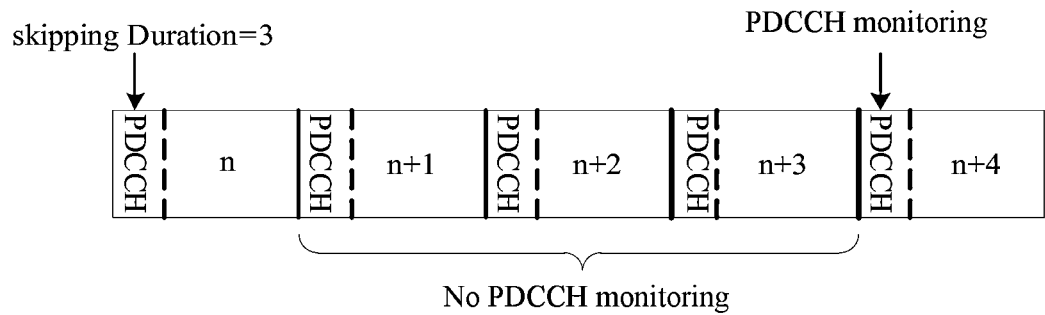
FIG. 3 shows a schematic diagram of skipping of all or part of the PDCCH monitoring.

The skipping of all or part of the PDCCH monitoring in the time period means that the UE does not receive and blindly decode the PDCCH in the time period. Taking the periodicity of PDCCH as one time slot as an example, referring to FIG. 3, it is assumed that the UE receives a PDCCH skipping instruction in the n-th time slot. The instruction indicates that the skipping duration of PDCCH monitoring is 3 time slots (or indicates that the skipping duration is an absolute time length, such as 5 ms), and this instruction is executed in the next time slot (with a delay of 1 slot). Therefore, the UE will not receive and blindly decode the PDCCH in (n+1)-th to (n+3)-th time slots, and restart to receive PDCCH on arrival at the (n+4)-th time slot. In this way, the base station may make the terminal enter a sleep state in which the PDCCH is not received, in the case of no data scheduling in a short time, so as to save the power of the terminal.

Figure 4:
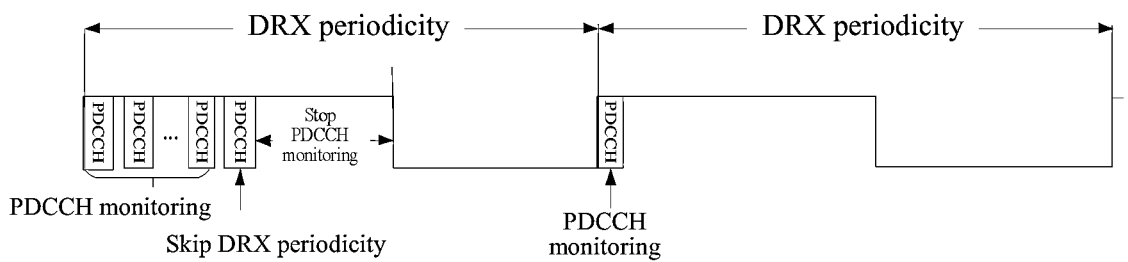
FIG. 4 shows a schematic diagram of not monitoring the physical downlink control channel during the current discontinuous reception periodicity.

In an embodiment of the present disclosure, the skipping of all or part of the physical downlink control channel monitoring in the time period may include: in a current discontinuous reception (DRX) periodicity, not monitoring the physical downlink control channel, which means that the indicated skipping duration of PDCCH monitoring is the remaining active part of the current DRX periodicity. For example, referring to FIG. 4, when the PDCCH indication information for indicating the skipping of PDCCH monitoring in the current DRX periodicity is received in a certain time slot in the current DRX periodicity, the PDCCH is not be monitored in the current DRX periodicity until the start time slot of the next DRX periodicity.

In a specific implementation, the parameter of the PDCCH search space is switched. For example, the search space of the UE before the switching is configured as: a periodicity of 20 ms, a monitoring duration of 5 ms, and an offset of 5 ms. After the switching, the search space of the UE is configured as: the period of 50 ms, the monitoring duration of 10 ms, and the offset of 0 ms. The UE receives the switching instruction in the n-th time slot; and monitors the PDCCH with the switched parameters of the search space, from the (n+X)-th time slot.

In a specific implementation, the switching of the PDCCH monitoring state may further include not monitoring certain DCI formats, or not monitoring certain control information sets, and the like.

In a specific implementation, when the PUSCH is scheduled in the same BWP, the value of X may be set in various methods.

In an embodiment of the present disclosure, the value of X is a fixed value. For example, X is set to be equal to 1. That is, the UE may monitor the PDCCH from the (n+1)-th time slot, based on the switched PDCCH monitoring state.

Figure 5:
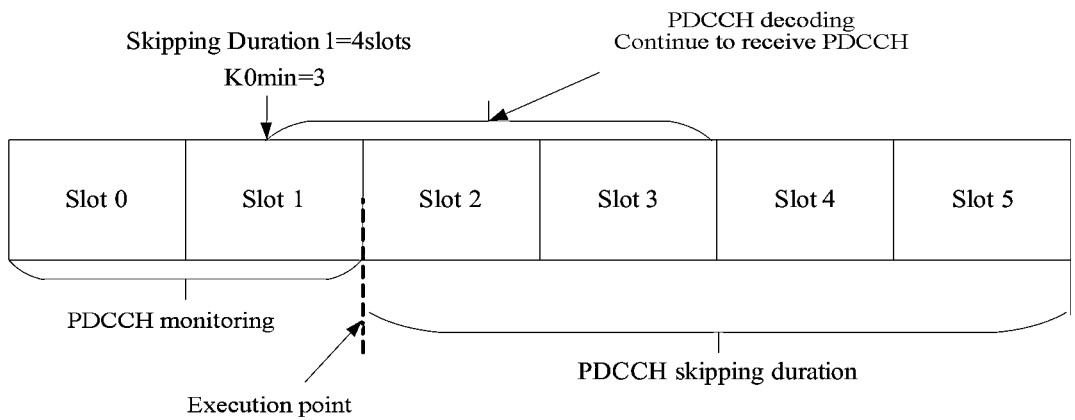
FIG. 5 shows a schematic diagram of determining an execution point for performing PDCCH monitoring according to an embodiment of the present disclosure.

Referring to FIG. 5, it is assumed that the UE receives DCI in a time slot Slot1. The DCI indicates that the skipping duration of PDCCH monitoring is 4 time slots, and the minimum available scheduling delay K0min when the PDSCH is scheduled is equal to 3. Therefore, the time slot Slot2 may be used as an execution point for executing the PDCCH monitoring based on the switched PDCCH monitoring state.

The inventor further found that when the base station sends an instruction for skipping the PDCCH monitoring to the terminal in the time slot Slot1, since the execution point is the next time slot and the skipping duration of PDCCH monitoring is 4 time slots, the base station does not transmit PDCCH in the time slots Slot2, Slot3, Slot4 and Slot5.

However, on the UE side, since the current K0min is equal to 3, the terminal may relax the processing of the PDCCH, and the UE needs to decode and obtain the DCI carrying the instruction for skipping the PDCCH monitoring in the time slot Slot3. During the DCI decoding process, the UE does not know whether the DCI includes the indication for skipping the PDCCH monitoring. Therefore, the UE needs to continue to receive the PDCCH in the time slots Slot2 and Slot3, which is an unnecessary blind decoding for the UE.

In addition, after decoding the DCI in Slot3, the UE finds that the indication for skipping the PDCCH monitoring needs to be executed, the execution point is the time slot 2 and the skipping duration of PDCCH monitoring is 4. The UE no longer monitors the PDCCH in the time slots Slot4 and Slot5. In this case, the terminal actually skips the PDCCH for only 2 time slots. If the skipping duration of PDCCH monitoring is less than the minimum available scheduling delay K0min, the UE is beyond the skipping duration of PDCCH monitoring when decoding the indication for skipping the PDCCH monitoring. When the UE decodes and obtains the PDCCH, the skipping duration of PDCCH monitoring has ended, and the UE needs to wake up to monitor the PDCCH. In this case, skipping the PDCCH becomes an invalid behavior.

In order to avoid the above situation, in an embodiment of the present disclosure, the skipping duration of PDCCH monitoring indicated in the DCI is greater than the minimum available scheduling delay K0min, such that skipping the PDCCH may be prevented from becoming an invalid behavior, thereby reducing UE power consumption.

In order to avoid the above situation, when the execution point is the next time slot of a time slot in which the DCI is received, the UE cannot relax the PDCCH processing. In this case, even if K0min is limited to a non-zero value, the terminal still needs to complete the decoding of the PDCCH in the time slot in which the PDCCH is received. But in this way, the acquisition of the power saving gain is limited.

In order to avoid limiting the acquisition of power saving gain and avoid skipping the PDCCH from becoming an invalid behavior, in an embodiment of the present disclosure, the value of X may be determined based on a value of a minimum available scheduling delay K0min activated and applied in a currently active downlink BWP.

In an embodiment of the present disclosure, when the minimum available scheduling delay K0min is greater than 0, the value of X is equal to the minimum available scheduling delay K0min. That is, in the case of K0min>0, X=K0min.

In an embodiment of the present disclosure, when minimum available scheduling delay K0min is greater than 0, the value of X may be a greater one of the minimum available scheduling delay K0min and Z. That is, in the case of K0min>0, X=Max (K0min, Z).

A value of Z corresponds to a subcarrier spacing of the currently active downlink BWP where the DCI is located. When the subcarrier spacing of the currently active downlink BWP where the DCI is located is 15 Khz, the value of Z is 1. When the subcarrier spacing of the currently active downlink BWP where the DCI is located is 30 Khz, the value of Z is 1. When the subcarrier spacing of the currently active downlink BWP where the DCI is located is 60 Khz, the value of Z is 2. When the subcarrier spacing of the currently active downlink BWP where the DCI is located is 120 Khz, the value of Z is 2.

For example, when the subcarrier spacing of the currently active downlink BWP where the DCI is located is 60 Khz, Z=2, and X=Max (K0min, 2). If K0min>2, X=K0min. In this case, the UE may monitor the physical downlink control channel from the (n+K0min)-th time slot, based on the switched physical downlink control channel monitoring state.

If K0min<2, X=2. In this case, the UE may monitor the physical downlink control channel from the (n+2)-th time slot based on the switched physical downlink control channel monitoring state.

Figure 6:
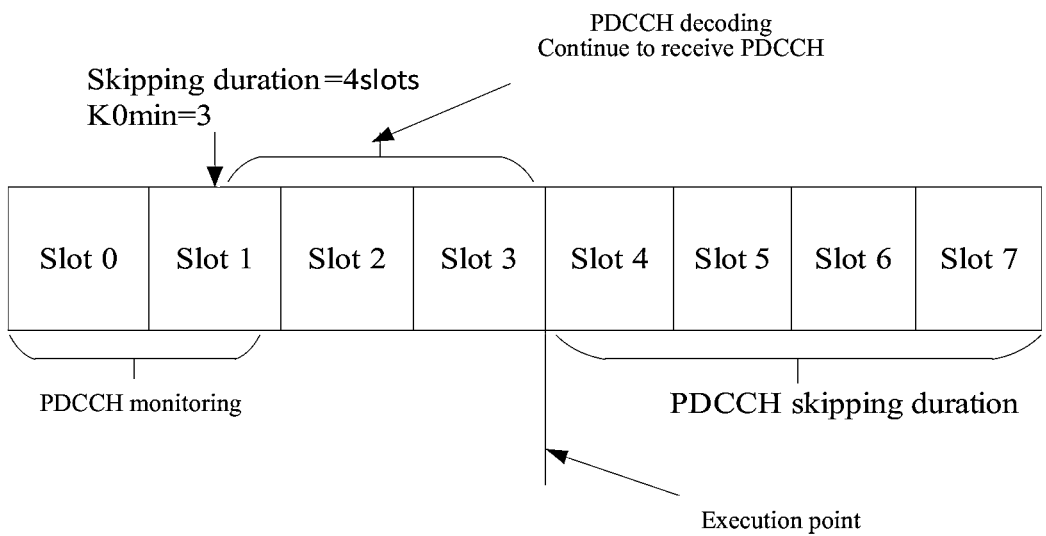
FIG. 6 shows a schematic diagram of determining an execution point for performing PDCCH monitoring according to another embodiment of the present disclosure.

Taking X=K0min as an example, referring to FIG. 6, it is assumed that the UE receives DCI in the time slot Slot1. The DCI indicates that the skipping duration of PDCCH monitoring is 4 time slots, and the minimum available time for scheduling the PDSCH K0min is equal to 3. In this case, the time slot Slot4 may be used as an execution point for executing the PDCCH monitoring based on the switched PDCCH monitoring state.

Since the skipping duration of PDCCH monitoring is not yet started when the UE decodes the indication for skipping the PDCCH monitoring, the behavior of the UE continuing to receive PDCCH in the time slots Slot2 and Slot3 is not an unnecessary blind decoding, and the UE skipping PDCCH becomes an invalid behavior.

Similarly, when X=Max (K0min, Z), the above effect can also be achieved.

In another embodiment of the present disclosure, when the minimum available scheduling delay K0min is equal to 0, the value of X is 1. That is, when K0min=0, X=1. The UE may monitor the physical downlink control channel from the (n+1)-th time slot, based on the switched physical downlink control channel monitoring state. For example, the UE may skip all or part of the PDCCH monitoring, from the (n+1)-th time slot.

In another embodiment of the present disclosure, when the minimum available scheduling delay K0min is equal to 0, the value of X is Z. That is, when K0min=0, X=Z. The UE may monitor the physical downlink control channel from the (n+Z)-th time slot, based on the switched physical downlink control channel monitoring state. For example, the UE may switch the parameter of the PDCCH search space, from the (n+Z)-th time slot.

It can be understood that, in a specific implementation, the method for monitoring the physical downlink control channel may be implemented by a software program, and the software program runs in a processor integrated in a chip or a chip module.

It should be noted from the above content that, in the method for monitoring the physical downlink control channel according to the embodiment of the present disclosure, when the same BWP is scheduled, in the case that the downlink control information includes switching indication information on the physical downlink control channel monitoring state, the physical downlink control channel is monitored from the (n+X)-th time slot, based on the switched physical downlink control channel monitoring state. In this way, the monitoring of the physical downlink control channel may be monitored in the same bandwidth part scheduling process.

In order for those skilled in the art to better understand and implement the present disclosure, an apparatuses and a computer readable storage medium corresponding to the above method are described in detail below.

Figure 7:
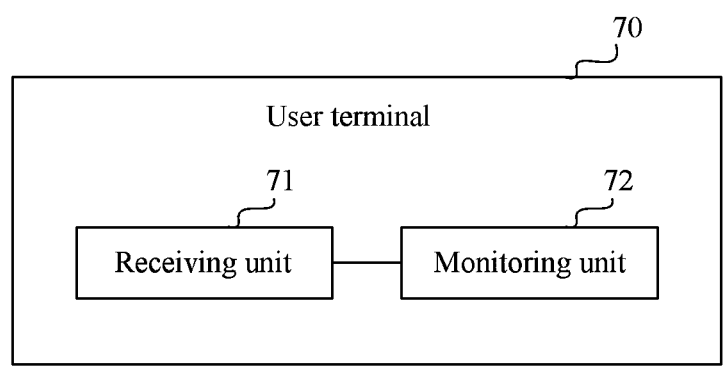
FIG. 7 shows a schematic structural diagram of user equipment according to an embodiment of the present disclosure.

Referring to FIG. 7, a user equipment 70 is further provided according to an embodiment of the present disclosure. The user equipment 70 may include: a receiving unit 71 and a monitoring unit 72.

The receiving unit is configured to receive downlink control information in an n-th time slot.

The monitoring unit is configured to perform the physical downlink control channel monitoring from a (n+X)-th time slot based on a switched physical downlink control channel monitoring state, in a case that the downlink control information includes switching indication information on the physical downlink control channel monitoring state, where n and X are both integers, and X is greater than or equal to 1.

In an embodiment of the present disclosure, a value of X is determined based on a value of a minimum available scheduling delay activated and applied in a currently active downlink bandwidth part.

In an embodiment of the present disclosure, in a case that the minimum available scheduling delay is greater than 0, the value of X is the minimum available scheduling delay or a greater one of the minimum available scheduling delay and Z, where a value of Z corresponds to a subcarrier spacing of the currently active downlink bandwidth part where the downlink control information is located; in a case that the minimum available scheduling delay is equal to 0, the value of X is 1 or Z.

In an embodiment of the present disclosure, in a case that the subcarrier spacing of the currently active downlink bandwidth part where the downlink control information is located is 15 Khz or 30 Khz, the value of Z is 1; and in a case that the subcarrier spacing of the currently active downlink bandwidth part where the downlink control information is located is 60 Khz or 120 Khz, the value of Z is 2.

In an embodiment of the present disclosure, the value of X is a fixed value.

In an embodiment of the present disclosure, in a case that X is equal to 1, a skipping duration of the physical downlink control channel monitoring indicated in the downlink control information is greater than the minimum available scheduling delay.

The apparatus (virtual apparatus) including the receiving unit 71 and the monitoring unit 72 may be, for example, a chip, a chip module, and the like.

A computer readable storage medium is further provided according to an embodiment of the present disclosure. The computer readable storage medium has a computer program stored thereon. The computer program, when being executed by a processor, implements steps of any one of the above methods.

In a specific implementation, the computer readable storage medium may include: a ROM, a RAM, a magnetic disk or an optical disk, and the like.

A user equipment is further provided according to an embodiment of the present disclosure. The user equipment includes a memory and a processor. The memory stores a computer program executable on the processor. The computer program is executed by the processor to implement steps of any one of the above methods.

Each module/unit included in each apparatus and product described in the above-mentioned embodiments may be a software module/unit, a hardware module/unit, or a part of module/unit is a software module/unit and a part of module/unit is a hardware module/unit. For example, for each apparatus or product applied to or integrated in a chip, each module/unit included therein may be implemented by hardware such as circuits, or at least some of the modules/units may be implemented by a software program running on the processor integrated inside the chip, the remaining (if any) part of the modules/units may be implemented by hardware such as circuits; for each apparatus and product applied to or integrated in the chip module, the modules/units included therein may be all implemented by hardware such as circuits, and different modules/units may be located in the same component (such as a chip, a circuit module, and the like) or in different components of the chip module, or at least some modules/units may be implemented by a software program running on the processor integrated inside the chip module, and the remaining (if any) part of the modules/units may be implemented by hardware such as circuits; for each apparatus and product applied to or integrated in the terminal, each module/unit included therein may be implemented by hardware such as circuits, and different modules/units may be located in the same component (such as a chip, a circuit module, and the like) or in different components of the terminal, or at least some of the modules/units may be implemented by a software program running on the processor integrated inside the terminal, and the remaining (if any) part of the modules/units may be implemented by hardware such as circuits.

Although the present disclosure is disclosed as above, the present disclosure is not limited thereto. Any person skilled in the art can make various changes and modifications without departing from the spirit and scope of the present disclosure. Therefore, the protection scope of the present disclosure should be defined by the claims.

The invention claimed is:

1. A method for monitoring a physical downlink control channel, comprising:

receiving downlink control information in an n-th time slot; and performing physical downlink control channel monitoring from a (n+X)-th time slot, based on a switched physical downlink control channel monitoring state, in a case that the downlink control information comprises switching indication information on a physical downlink control channel monitoring state; wherein n and X are both integers, and X is greater than or equal to 1;

wherein the switching indication information on the physical downlink control channel monitoring state comprises:

skipping all or part of the physical downlink control channel monitoring in a time period; and switching a parameter of a physical downlink control channel search space.

2. The method for monitoring the physical downlink control channel according to claim 1, wherein the value of X is determined based on a value of a minimum available scheduling delay activated and applied in a currently active downlink bandwidth part.

3. The method for monitoring the physical downlink control channel according to claim 2, wherein the value of X is determined based on the value of the minimum available scheduling delay activated in the currently active downlink bandwidth part by:

in a case that the minimum available scheduling delay is greater than 0, the value of X is the minimum available scheduling delay, or a greater of the minimum available scheduling delay and Z, wherein a value of Z corresponds to a subcarrier spacing of the currently active downlink bandwidth part where the downlink control information is located; and in a case that the minimum available scheduling delay is equal to 0, the value of X is 1 or Z.

4. The method for monitoring the physical downlink control channel according to claim 3, wherein in a case that the subcarrier spacing of the currently active downlink bandwidth part where the downlink control information is located is 15 Khz or 30 Khz, the value of Z is 1; and in a case that the subcarrier spacing of the currently active downlink bandwidth part where the downlink control information is located is 60 Khz or 120 Khz, the value of Z is 2.

5. The method for monitoring the physical downlink control channel according to claim 1, wherein the value of X is a fixed value.

6. The method for monitoring the physical downlink control channel according to claim 5, wherein in a case that X is equal to 1, a skipping duration of the physical downlink control channel monitoring indicated in the downlink control information is greater than a minimum available scheduling delay.

7. The method for monitoring the physical downlink control channel according to claim 1, wherein the skipping all or part of the physical downlink control channel monitoring in the time period comprises:

during a current discontinuous reception periodicity, not monitoring the physical downlink control channel.

8. A user equipment, comprising:
a memory; and
a processor, wherein the memory stores a computer program executable on the processor, wherein the computer program, when being executed by the processor, causes the processor to:

receive downlink control information in an n-th time slot; and perform physical downlink control channel monitoring from a (n+X)-th time slot, based on a switched physical downlink control channel monitoring state, in a case that the downlink control information comprises switching indication information on a physical downlink control channel monitoring state; wherein n and X are both integers, and X is greater than or equal to 1;

wherein the switching indication information on the physical downlink control channel monitoring state comprises:

skipping all or part of the physical downlink control channel monitoring in a time period; and switching a parameter of a physical downlink control channel search space.

9. The user equipment according to claim 8, wherein the value of X is determined based on a value of a minimum available scheduling delay activated and applied in a currently active downlink bandwidth part.

10. The user equipment according to claim 9, wherein in a case that the minimum available scheduling delay is greater than 0, the value of X is the minimum available scheduling delay, or a greater of the minimum available scheduling delay and Z, wherein a value of Z corresponds to a subcarrier spacing of the currently active downlink bandwidth part where the downlink control information is located, and in a case that the minimum available scheduling delay is equal to 0, the value of X is 1 or Z.

11. The user equipment according to claim 10, wherein in a case that the subcarrier spacing of the currently active downlink bandwidth part where the downlink control information is located is 15 Khz or 30 Khz, the value of Z is 1; and in a case that the subcarrier spacing of the currently active downlink bandwidth part where the downlink control information is located is 60 Khz or 120 Khz, the value of Z is 2.

12. The user equipment according to claim 8, wherein the value of X is a fixed value.

13. The user equipment according to claim 12, wherein in a case that X is equal to 1, a skipping duration of the physical downlink control channel monitoring indicated in the downlink control information is greater than a minimum available scheduling delay.

14. A non-transitory computer readable storage medium having a computer program stored thereon, wherein the computer program, when being executed by a processor, causes the processor to:

receive downlink control information in an n-th time slot; and perform physical downlink control channel monitoring from a (n+X)-th time slot, based on a switched physical downlink control channel monitoring state, in a case that the downlink control information comprises switching indication information on a physical downlink control channel monitoring state; wherein n and X are both integers, and X is greater than or equal to 1;

wherein the switching indication information on the physical downlink control channel monitoring state comprises:
  skipping all or part of the physical downlink control channel monitoring in a time period; and
  switching a parameter of a physical downlink control channel search space.

15. The non-transitory computer readable storage medium according to claim 14, wherein the value of X is determined based on a value of a minimum available scheduling delay activated and applied in a currently active downlink bandwidth part.

16. The non-transitory computer readable storage medium according to claim 15, wherein in a case that the minimum available scheduling delay is greater than 0, the value of X is the minimum available scheduling delay, or a greater of the minimum available scheduling delay and Z, wherein a value of Z corresponds to a subcarrier spacing of the currently active downlink bandwidth part where the downlink control information is located, and in a case that the minimum available scheduling delay is equal to 0, the value of X is 1 or Z.

17. The non-transitory computer readable storage medium according to claim 16, wherein in a case that the subcarrier spacing of the currently active downlink bandwidth part where the downlink control information is located is 15 Khz or 30 Khz, the value of Z is 1; and in a case that the subcarrier spacing of the currently active downlink bandwidth part where the downlink control information is located is 60 Khz or 120 Khz, the value of Z is 2.

18. The non-transitory computer readable storage medium according to claim 14, wherein the value of X is a fixed value.

19. The non-transitory computer readable storage medium according to claim 18, wherein in a case that X is equal to 1, a skipping duration of the physical downlink control channel monitoring indicated in the downlink control information is greater than a minimum available scheduling delay.

* * * * *